United States Patent
Bu

(10) Patent No.: US 7,312,776 B2
(45) Date of Patent: *Dec. 25, 2007

(54) APPARATUS SET IN A LIQUID CRYSTAL DISPLAY FOR EXECUTING GAMMA CORRECTION AND METHOD THEREOF

(75) Inventor: Lin-Kai Bu, Tainan (TW)

(73) Assignee: Himax Technologies Limited, Tainan County (TW)

( * ) Notice: Subject to any disclaimer, the term of this patent is extended or adjusted under 35 U.S.C. 154(b) by 624 days.

This patent is subject to a terminal disclaimer.

(21) Appl. No.: 10/292,754

(22) Filed: Nov. 13, 2002

(65) Prior Publication Data

US 2003/0122754 A1    Jul. 3, 2003

(30) Foreign Application Priority Data

Dec. 31, 2001   (TW) .............................. 90133346 A

(51) Int. Cl.
*G09G 3/36*  (2006.01)

(52) U.S. Cl. ...................................... 345/88; 345/690

(58) Field of Classification Search ............ 345/87–89, 345/72, 77, 204, 690
See application file for complete search history.

(56) References Cited

U.S. PATENT DOCUMENTS

| | | | |
|---|---|---|---|
| 5,877,717 A * | 3/1999 | Tu et al. ..................... 341/150 |
| 6,215,468 B1 * | 4/2001 | Van Mourik ................ 345/605 |
| 6,313,816 B1 * | 11/2001 | Kojima et al. ................ 345/83 |
| 6,330,076 B1 * | 12/2001 | Imaizumi et al. ............ 358/1.9 |
| 6,535,301 B1 * | 3/2003 | Kuwata et al. .............. 358/1.9 |
| 6,795,063 B2 * | 9/2004 | Endo et al. ................. 345/204 |
| 6,944,335 B2 * | 9/2005 | Pettigrew et al. ........... 382/167 |
| 7,012,591 B2 * | 3/2006 | Chen et al. ................... 345/88 |
| 2001/0036310 A1 * | 11/2001 | Pettigrew et al. ........... 382/167 |
| 2001/0053248 A1 * | 12/2001 | Maeda ....................... 382/165 |
| 2001/0055007 A1 * | 12/2001 | Miura et al. ................ 345/204 |
| 2002/0126106 A1 * | 9/2002 | Naito ......................... 345/204 |
| 2003/0043394 A1 * | 3/2003 | Kuwata et al. .............. 358/1.9 |
| 2003/0080931 A1 | 5/2003 | Chen et al. |

* cited by examiner

*Primary Examiner*—Sumati Lefkowitz
*Assistant Examiner*—Srilakshmi K Kumar
(74) *Attorney, Agent, or Firm*—Rabin & Berdo, PC

(57) ABSTRACT

An apparatus set in a liquid crystal display (LCD) for executing gamma correction is disclosed. The gamma voltage signal is for inputting to a pixel. The digital pixel signal is an M-bit binary signal. The gamma correction executing apparatus includes a pixel signal converting device for converting the digital pixel signal to a converted pixel signal and a gamma correcting device coupled to the pixel signal converting device for outputting the gamma voltage signal according to the converted pixel signal. The converted pixel signal is an N-bit binary signal, and N is larger than M. The relation between the digital pixel signal and the converted pixel signal and the relation between the converted pixel signal and the gamma voltage signal are determined according to the displaying color of the pixel.

28 Claims, 8 Drawing Sheets

TDATA'_B(0, 1, 2, 3)

DATA' (0, 1, 2, 3) ⟶ TDATA'_G(0, 1, 2, 4)

TDATA'_R(0, 1, 3, 5)

FIG. 9A

| DATA'    | 00  | 01  | 10  | 11  |
|----------|-----|-----|-----|-----|
| TDATA'_B | 000 | 001 | 010 | 011 |
| TDATA'_G | 000 | 001 | 010 | 100 |
| TDATA'_R | 000 | 001 | 011 | 101 |

APPARATUS SET IN A LIQUID CRYSTAL DISPLAY FOR EXECUTING GAMMA CORRECTION AND METHOD THEREOF

This application incorporates by reference of Taiwan application Serial No. 090133346, filed Dec. 31, 2001.

BACKGROUND OF THE INVENTION

1. Field of the Invention

The invention relates in general to an apparatus for converting a digital signal to a corresponding analog signal and a method thereof, and more particularly, to the apparatus set in the liquid crystal display for executing gamma correction and the method thereof.

2. Description of the Related Art

Featuring the favorable advantages of thinness, lightness, and generating low radiation, liquid crystal displays (LCDs) have been widely used. The LCD panel includes a number of pixels and the light transmittance of each pixel is determined by the difference between the upper plate voltage and the lower plate voltage.

FIG. 1 shows the gamma relation between the gamma voltage and the luminance of the pixel. The X-axis represents the lower plate voltage and the Y-axis represents the light transmittance of the pixel. When the magnitude of the upper plate voltage is fixed, the difference between the upper plate voltage and lower plate voltage is determined by the magnitude of the lower plate voltage. The corresponding relation between the lower plate voltage and the light transmittance of the pixel is nonlinear, as shown by the gamma curve in FIG. 1, wherein the difference between the upper and lower plate voltage is called the gamma voltage. The gamma curve shown in FIG. 1 includes a positive polarity gamma curve 102 and a negative polarity gamma curve 104. Each light transmittance of the pixel corresponds to a positive polarity gamma voltage signal and a negative polarity gamma voltage signal. The luminance of the pixel can be determined by the light transmittance of the pixel. Therefore, the luminance of the pixel can be controlled by controlling the magnitude of the gamma voltage according to the gamma curve.

FIG. 2 shows the block diagram of a nonlinear digital-to-analog converter (DAC) 202. The driving circuit of the liquid crystal display includes a nonlinear digital-to-analog converter 202 for converting the digital pixel signal (DATA) to the corresponding analog gamma voltage signal (OUT). Since the relation between the luminance of the pixel and the gamma voltage is not linear, the corresponding relation between the digital pixel signal (DATA) and the luminance of the pixel then is approximated as linear by executing the gamma correction according to the gamma curve. This process is called gamma correction.

FIG. 3 shows the ideal relation between each digital pixel signal and the corresponding light transmittance of the pixel. Each digital pixel signal is an eight-bit binary signal. Thus, there are 256 digital pixel signals for representing 256 gray level luminance of the pixel respectively. Through executing gamma correction using the nonlinear digital-to-analog converter 202, the relation between each digital pixel signal and the corresponding light transmittance of the pixel can be linear, as shown by the solid line in FIG. 3.

FIGS. 4A~4C show the method of performing the gamma correction. In FIG. 4A, the points A, B, C, D, and E chosen from the positive polarity gamma curve 402 and the points A', B', C', D', and E' chosen from the negative polarity gamma curve 404 are specific reference points. According to the gamma curve shown in FIG. 4, each reference point corresponds to a reference gamma voltage signal (V0~V9). Each positive polarity gamma voltage signal (V0, V1, V2, V3, and V4) and the corresponding negative polarity gamma voltage signal (V9, V8, V7, V6, and V5) correspond to the same reference digital pixel signal (0, 63, 127, 191, and 255) respectively, as shown in FIG. 4A. Since the relation between each gamma voltage signal (V0~V4 and V9~V5) and the light transmittance of the pixel (T0~T4) is the nonlinear gamma curve shown in FIG. 4B, the relation between each reference digital pixel signal (0, 63, 127, 191, and 255) and the corresponding reference gamma voltage signal (V0~V4 and V9~V5) cannot be linear but is like the gamma curve shown in FIG. 4A instead. In this manner, the relation between each digital pixel signal (0, 63, 127, 191, and 255) and the corresponding light transmittance of the pixel (T0, T1, T2, T3, and T4) respectively can be linear, as shown in FIG. 4C. When performing the gamma correction, the nonlinear DAC converts each digital pixel signal to the corresponding gamma voltage signal according to the relation between the reference digital pixel signal and the corresponding reference gamma voltage signal.

The conventional nonlinear digital-to-analog converter 202 includes two strings of resistors. Each resistor string includes 255 resistors. Furthermore, each resistor string includes five input nodes (V0~V4, V5~V9) for receiving the reference gamma voltage signals and 256 output nodes for outputting the gray level voltage signals. When the gamma correction is executed, the gamma output voltage signal corresponding to the digital pixel signal can be determined according to the gray level voltage signals.

FIGS. 5A~5C show three different gamma curves related to the colors red, blue, and green. The color liquid crystal display includes three different kinds of pixels for displaying red, blue, and green respectively, and the three gamma curves are marked "R", "G", and "B" for each respective color, as shown in FIG. 5A. Each color corresponds to the specific gamma curve. According to the "R", "G", and "B" gamma curves, the gamma voltages corresponding to the maximum luminance of the pixels are $V_{RM}$, $V_{BM}$, and $V_{GM}$ for red, blue, and green respectively. The magnitude of $V_{BM}$ is smaller than that of $V_{GM}$, and $V_{GM}$ is smaller than $V_{RM}$, i.e. $V_{BM} < V_{GM} < V_{RM}$. When executing the conventional gamma correction, the maximum magnitude of the gamma voltage signal outputted from the conventional nonlinear digital-to-analog converter is set to be $V_{BM}$ and all other gamma voltage signals corresponding to the digital pixel signals are determined according to the magnitude of $V_{BM}$. Therefore, the relation between each digital pixel signal and the corresponding gamma voltage signal is fixed regardless of the displaying color of the pixel corresponding to the digital pixel signal.

For example, after setting the maximum gamma voltage signal to be $V_{BM}$, the relation between each of the digital pixel signals 0, 63, 127, 191, and 255 and the corresponding gamma voltage signal V0, V1, V2, V3, and V4 respectively can be determined so as to maintain the linear relation between each digital pixel signal and the corresponding light transmittance of the pixel, as shown in FIGS. 4A~4C and FIG. 5A. However, the gamma curves for green, red, and blue are all different. If the relation between each of the digital pixel signals 0, 63, 127, 191, and 255 and the corresponding gamma voltage signal V0, V1, V2, V3, and V4 respectively is determined according to one of the three gamma curves, and for the digital pixel signals for displaying the other two colors, the relation between each digital pixel signal and the corresponding light transmittance of the pixel cannot be linear, as shown in FIGS. 5B and 5C. Also, if the displaying color of the pixel is red or green, the luminance of the pixel cannot be at its maximum luminance since the maximum magnitude of the gamma voltage signal is set to be $V_{BM}$, and $V_{BM}<V_{GM}<V_{RM}$. Therefore, the displaying performance of the display panel is degraded.

SUMMARY OF THE INVENTION

It is therefore an object of the invention to provide an improved apparatus for converting the digital pixel signal to the corresponding gamma voltage signal and a method thereof, so as to achieve the objectives. If the digital pixel signal is at its maximum magnitude, the corresponding pixel, regardless of the displaying color, can be at its maximum luminance. In this manner, the displaying performance of the display panel can be improved.

The invention achieves the above-identified objects by providing an apparatus configured in a liquid crystal display (LCD) for executing gamma correction. The gamma voltage signal is for applying onto a pixel. The digital pixel signal is an M-bit binary signal. The gamma correction executing apparatus includes a pixel signal converting device for converting the digital pixel signal to a converted pixel signal and a gamma correcting device coupled to the pixel signal converting device for outputting the gamma voltage signal according to the converted pixel signal. The converted pixel signal is an N-bit binary signal, and N is larger than M.

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIGS. 9A~9B show an example for explaining the relation between each digital pixel signal and the corresponding converted pixel signal;

DETAILED DESCRIPTION OF THE INVENTION

The feature of the present invention is that the displaying color of the pixel corresponding to the digital pixel signal is considered when executing the gamma correction. The relation between each digital pixel signal and the corresponding analog gamma voltage signal is determined according to the specific gamma curve for the specific color. In this manner, the relation between each digital pixel signal and the corresponding light transmittance of the pixel can be linear, regardless of the displaying color of the pixel, so that all pixels, regardless of the displaying color, can be at its maximum luminance. Thus, the performance of the display panel can be improved.

Figure 1:
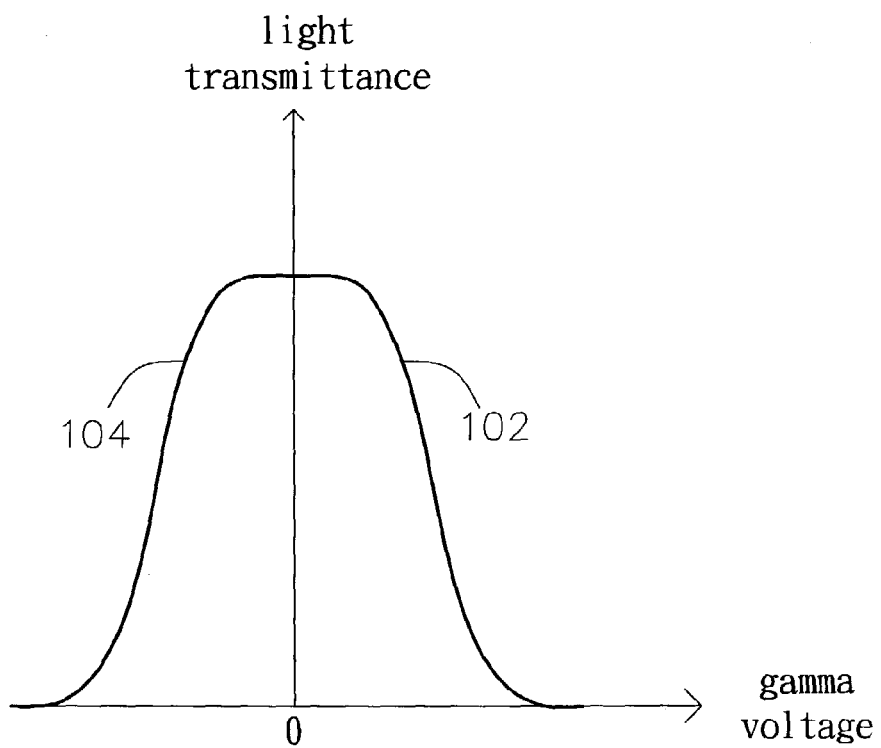
FIG. 1 shows the gamma relation between the gamma voltage and the luminance of the pixel.
Figure 2:
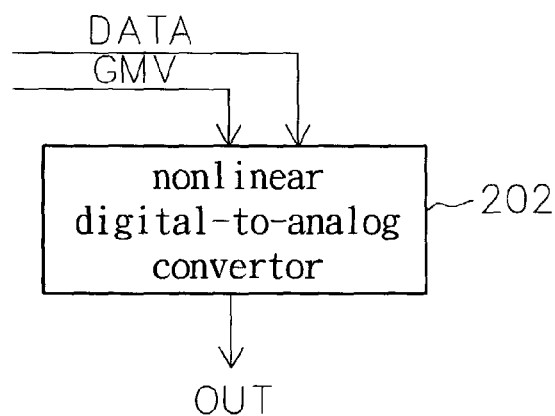
FIG. 2 shows the block diagram of a nonlinear digital-to-analog converter (DAC)
Figure 3:
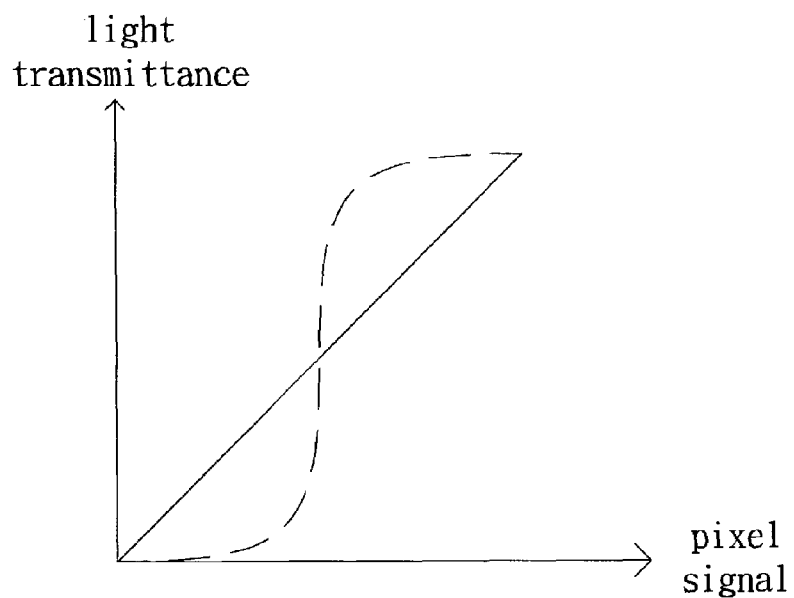
FIG. 3 shows the ideal relation between each digital pixel signal and the corresponding light transmittance of the pixel.
Figure 4A:
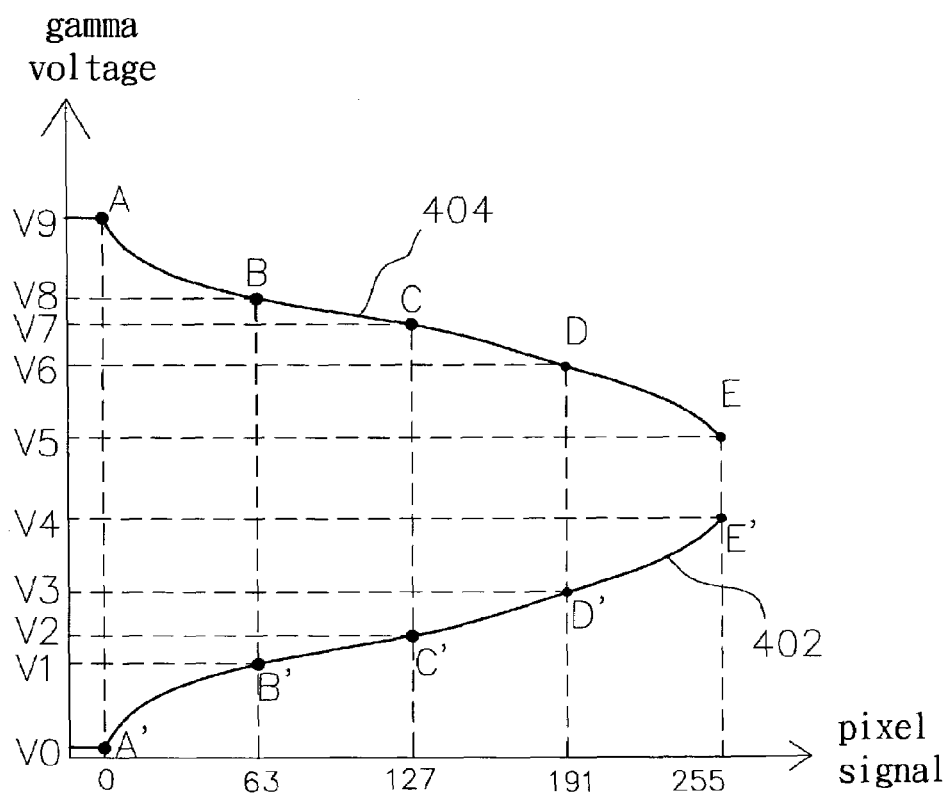
FIGS. 4A~4C show the method of determining the relation between each digital pixel signal and the light transmittance of the pixel by gamma correction.
Figure 4B:
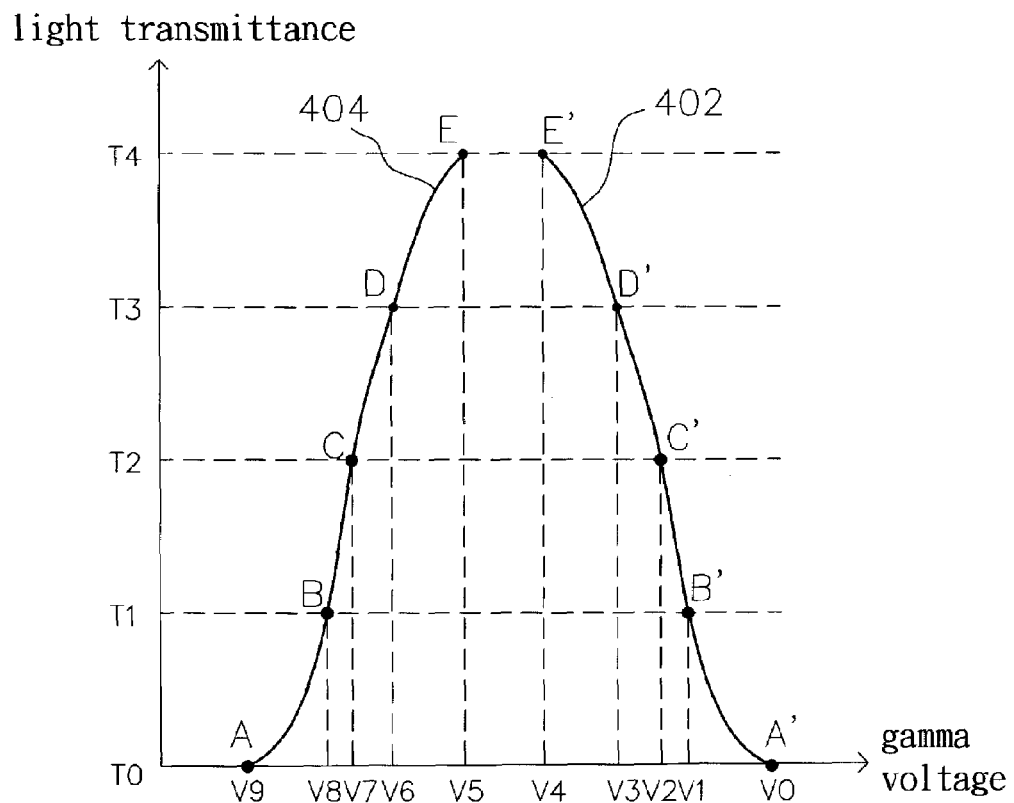
Figure 4C:
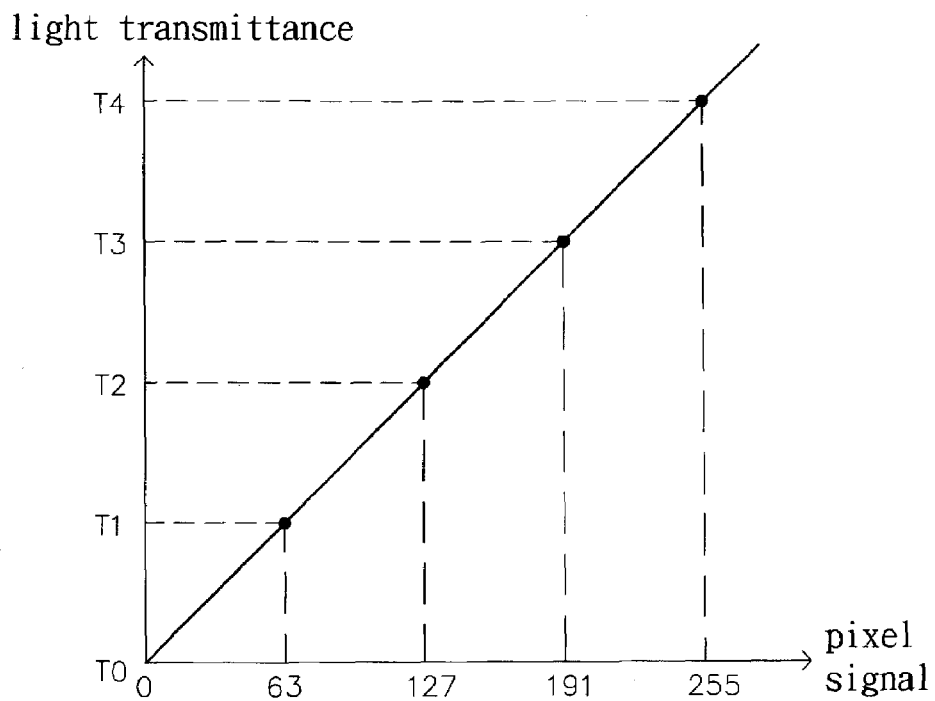
Figure 5A:
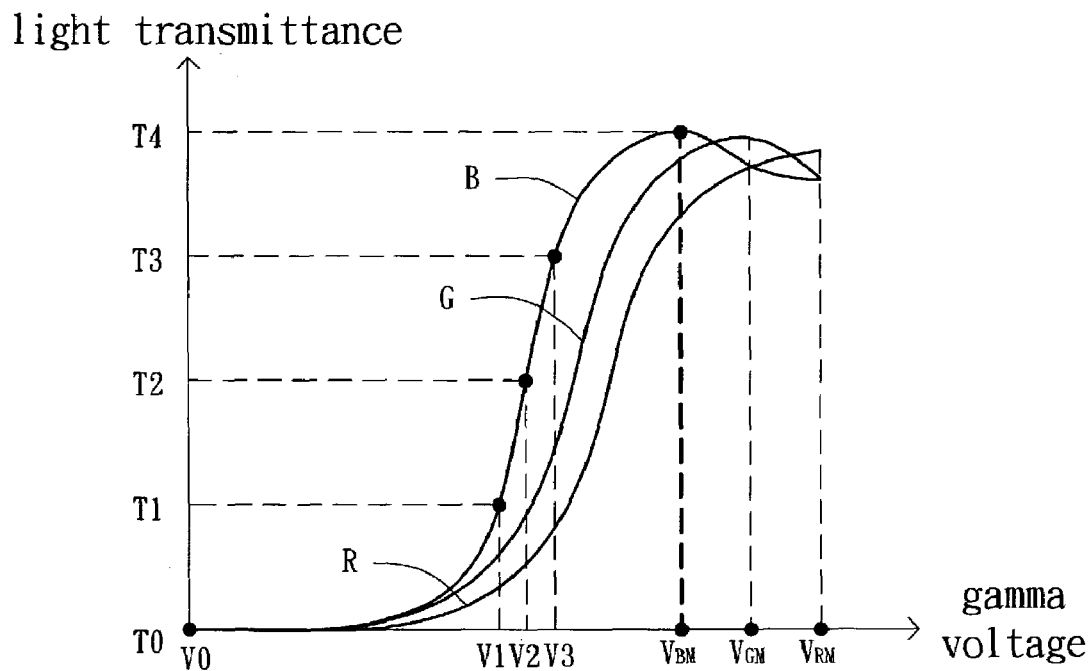
FIGS. 5A~5C show three different gamma curves for red, blue, and green respectively.
Figure 5B:
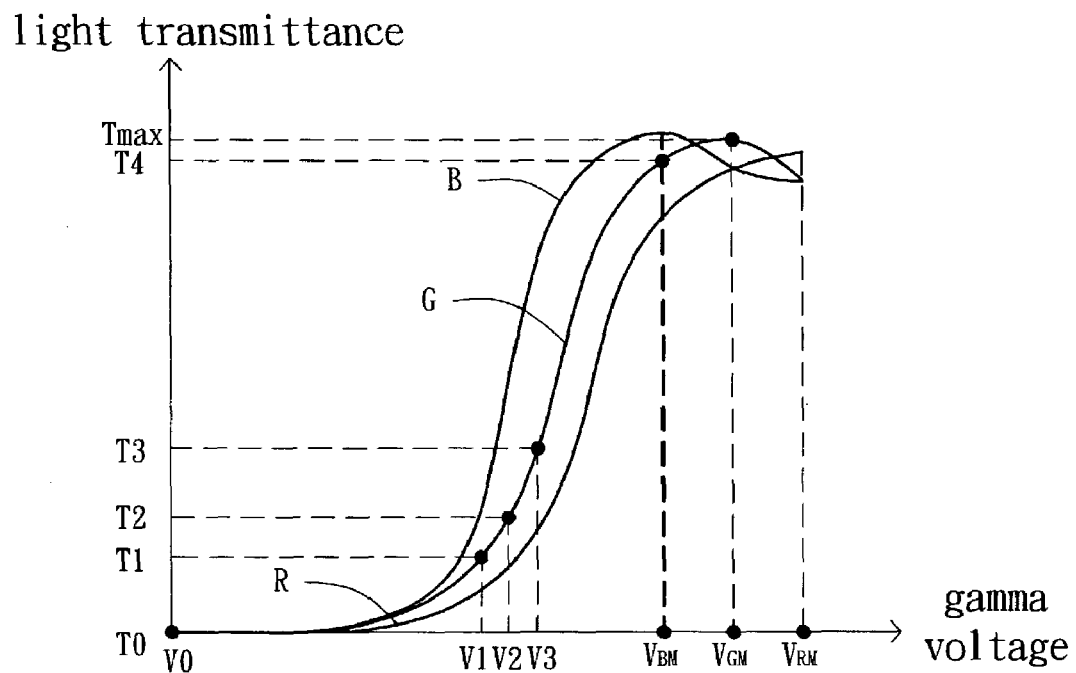
Figure 5C:
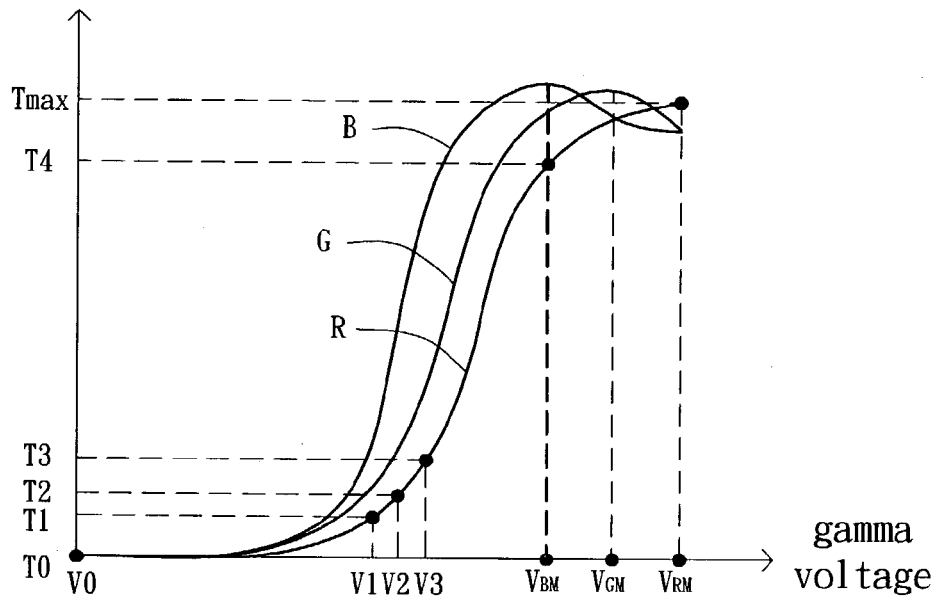
Figure 6:
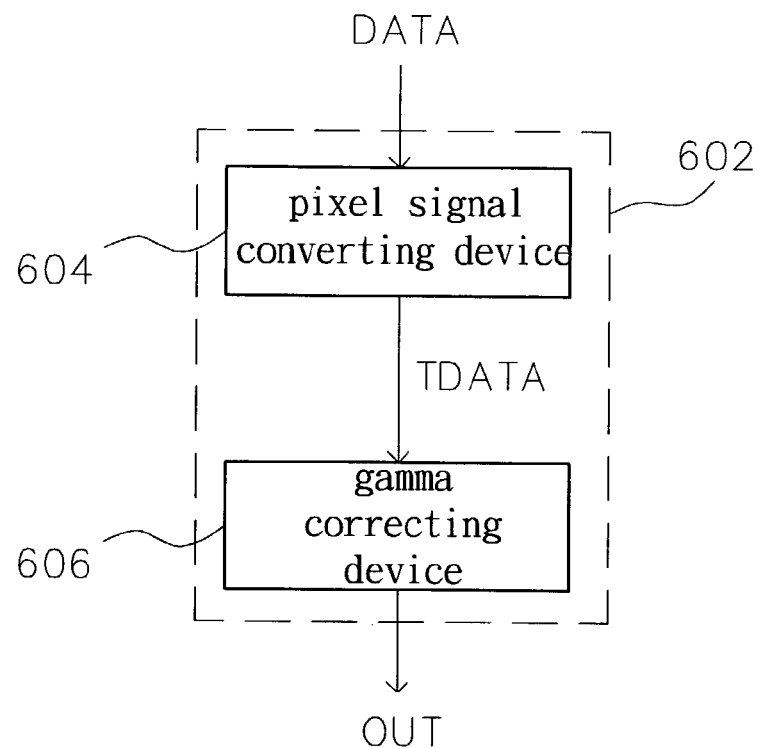
FIG. 6 shows the block diagram of the gamma correcting apparatus according to the embodiment of the present invention.

FIG. 6 shows the block diagram of the gamma correcting apparatus according to the embodiment of the present invention. The gamma correcting apparatus 602 is set in the driving circuit of the liquid crystal display for converting the digital pixel signal to the corresponding gamma voltage signal. The digital-to-analog converting apparatus 602 includes a pixel signal converting device 604 for converting the digital pixel signal (DATA) to the corresponding converted pixel signal (TDATA) and a gamma correcting device 606 for executing the gamma correction.

Figure 7:
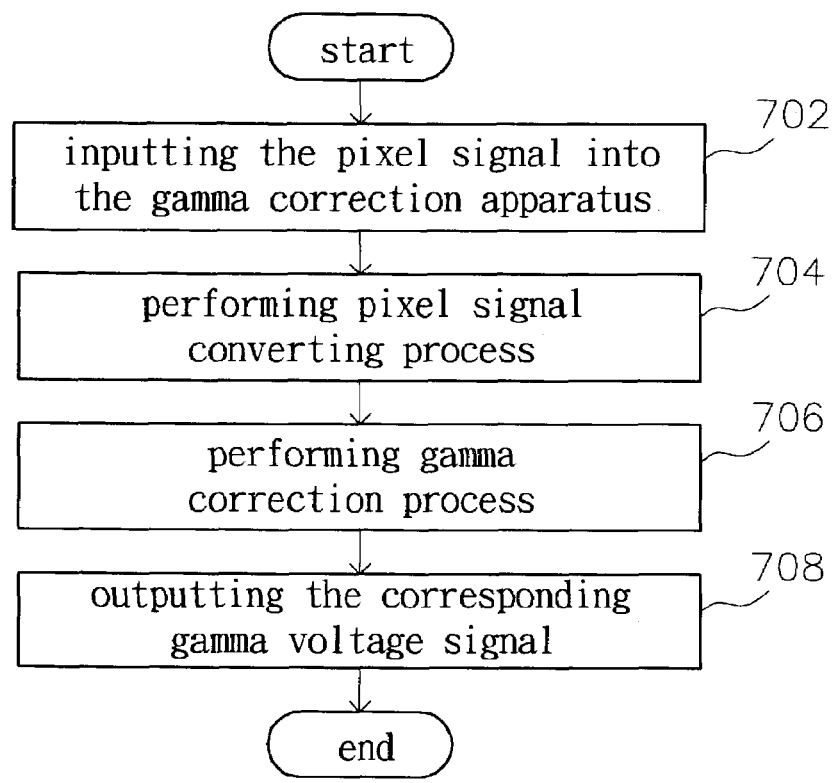
FIG. 7 shows the flow chart of the gamma correction method executed by the gamma correcting apparatus shown in FIG. 6.

FIG. 7 shows the flow chart of the gamma correction method executed by the gamma correcting apparatus shown in FIG. 6. The gamma correction method according to the embodiment of the present invention includes the following steps. First, in the step 702, the digital pixel signal (DATA) is inputted into the gamma correcting apparatus 602. The digital pixel signal (DATA) is an eight-bit binary signal. Then, in the step 704, the pixel signal converting process is performed. The converted pixel signal (TDATA) can be determined according to the digital pixel signal (DATA) and corresponding colors, such as red, green and blue.

Figure 8:
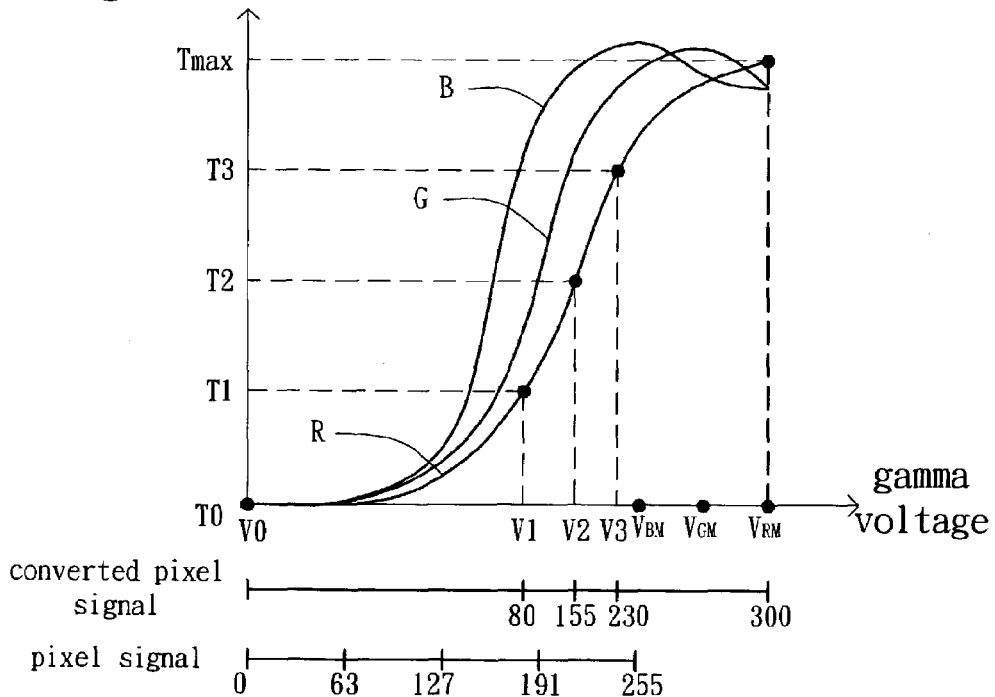
FIG. 8 shows the method of executing gamma correction according to the embodiment of the present invention.

FIG. 8 shows the method of executing the gamma correction according to the embodiment of the present invention with the three different gamma curves for red, blue, and green, which are marked "R", "G", and "B" respectively. Each color corresponds to the specific gamma curve. According to the "R", "G", and "B" gamma curves, the gamma voltage corresponding to the maximum luminance is $V_{RM}$, $V_{BM}$, and $V_{GM}$ for red, blue, and green respectively. The magnitude of $V_{BM}$ is smaller than that of $V_{GM}$, and $V_{GM}$ is smaller than $V_{RM}$, i.e. $V_{BM}<V_{GM}<V_{RM}$. According to the conventional gamma correction method, the maximum gamma voltage signal is determined to be $V_{BM}$. The maximum digital pixel signal 255, which is represented in the decimal form, corresponds to the gamma voltage signal $V_{BM}$. The gamma voltage signals (OUT) corresponding to all other digital pixel signals (DATA) smaller than 255 can be determined after the relation between the digital signal pixel 255 and its corresponding gamma voltage signal $V_{BM}$ is determined. However, for the digital pixel signals (DATA), which have the displaying color of the corresponding pixel of not blue but either red or green, if the maximum gamma voltage signal (OUT) is set to be $V_{BM}$ and the digital pixel signal (DATA) corresponding to the maximum gamma voltage $V_{BM}$ is determined to be 255, then the pixel receiving the gamma voltage $V_{BM}$ cannot be at the maximum luminance when the displaying color of the pixel is either red or green. The performance of the panel is degraded seriously.

According to the present invention, the maximum magnitude of the gamma voltage signal (OUT) is determined to be $V_{RM}$, instead of $V_{BM}$. All other gamma voltage signals (OUT) corresponding to the digital pixel signals (DATA) are determined according to the magnitude of $V_{RM}$. Taking the digital pixel signals (DATA) which have the displaying color of the corresponding pixels as red as an example, if the pixel signal (DATA) corresponding to the gamma voltage signal $V_{BM}$ is determined to be 255, then the pixel signals (DATA) corresponding to the gamma voltage signals and larger than $V_{BM}$, such as $V_{RM}$, must be larger than 255. According to the embodiment of the present invention, the maximum gamma voltage signal (OUT) is set to be $V_{RM}$ and the pixel signal (DATA) corresponding to the maximum gamma voltage signal $V_{RM}$ is determined to be 300. The digital pixel signals (DATA) can be represented by eight-bit binary numbers and the maximum digital pixel signal (DATA) is 255, which is represented by a decimal number. In the present invention, the pixel signal converting process 704 needs to be performed for converting each eight-bit digital pixel signal (DATA) to a corresponding nine-bit converted pixel signal (TDATA). Because the maximum converted pixel signal (TDATA) can be larger than 255, the gamma voltage signal (OUT) corresponding to the digital pixel signal (DATA) can be larger than $V_{RM}$, instead Of $V_{BM}$.

Since the magnitude range of the converted pixel signals (0~300) is larger than that of the digital pixel signal (0~255), two adjacent digital pixel signals (DATA) may not necessarily correspond to two adjacent converted pixel signals (TDATA) respectively. The method of determining the relation between each digital pixel signal (DATA) and its corresponding converted pixel signal (TDATA) is disclosed as follows. If the maximum gamma voltage signal is determined to be $V_{RM}$ and the maximum converted pixel signal (TDATA) is determined to be 300. The relation of all other converted pixel signals (TDATA) and the corresponding gamma voltage signal (OUT) can be determined respectively according to the gamma curve for red, as shown in FIG. 8. In this manner, the relation between each digital pixel signal (DATA) and the corresponding converted pixel signal (TDATA) can be determined according to the gamma curve for red so as to keep the linear relation between each digital pixel signal (DATA) and the corresponding light transmittance of the pixel.

For the digital pixel signals 0, 63, 127, 191, and 255, which have the displaying color of the corresponding pixels of red, the converted pixel signals are 0, 80, 155, 230, and 300 respectively, when the pixel signal converting process is performed. It should be mentioned that the scale of the converted pixel signals (TDATA) is not linear. Referring to FIG. 8, the slope of the middle portion of the gamma curve is larger than that of the beginning portion and the end portion of the gamma curve. Therefore, the interval between two adjacent converted pixel signals (TDATA) corresponding to the middle portion of the gamma curve is smaller than the interval between two adjacent converted pixel signals (TDATA) corresponding to either the beginning portion or the end portion of the gamma curve, as shown in FIG. 8. In this manner, the magnitude range of the converted pixel signal (TDATA) needed for performing pixel signal converting process 704 can be reduced.

In addition, the relation between each digital pixel signal (DATA) and its corresponding converted pixel signal (TDATA) is not fixed but can be changed according to the displaying color of the corresponding pixel, because the gamma curves for the different colors are different. The relation between each digital pixel signal (DATA) and its corresponding converted pixel signal (TDATA) is determined according to the gamma curve for the specific color and is stored in the form of a look up table (LUT) in the pixel signal converting device 604. Therefore, two digital pixel signals (DATA) of the same magnitude may correspond to different converted pixel signals (TDATA) respectively, if the displaying colors of the corresponding pixels are different.

FIGS. 9A and 9B show an example for explaining the relation between each digital pixel signal and the corresponding converted pixel signal. Converting two-bit pixel signals (DATA') to the corresponding three-bit converted pixel signal (TDATA') is taken as an example for explaining the operation of the pixel signal converting process 704. The magnitude range of the two-bit pixel signal (DATA') is 0~3, which is represented by the decimal number, as shown in the form of DATA'(0,1,2,3) in FIG. 9A. The magnitude range of the converted pixel signal (TDATA') is wider than that of the pixel signal (DATA'). Therefore, the converted pixel signal (TDATA') is represented in three bits instead of two bits. The converted three-bit converted pixel signals (TDATA') corresponding to the two-bit pixel signals (DATA') are determined according to the displaying color. Taking the pixel signals (DATA') which have the displaying color of the corresponding pixels of red as an example, each of the pixel signals DATA'(0,1,2,3) corresponds to the converted pixel signal TDATA'_R(0,1,3,5). In the same manner, each of the pixel signals DATA'(0,1,2,3) corresponds to the converted pixel signal TDATA'_G(0,1,2,4) for the displaying color of green, and each of the pixel signals DATA'(0,1,2,3) corresponds to the converted pixel signal TDATA'_B(0,1,2,3) for the displaying color of blue, as shown in FIG. 9A. In FIG. 9B, each pixel signal (DATA') is represented in the form of a two-bit binary number and each converted pixel signal (TDATA') is represented in the form of a three-bit binary number. The difference among gamma curves is not great. Therefore, it is possible that the same pixel signals (DATA') for different displaying colors respectively correspond to the same converted pixel signal (TDATA'), such as the same pixel signals DATA'(10) for blue and green corresponding to TDATA'_B(010) and TDATA'_G(010) respectively. It is also possible that two different pixel signals (DATA') for different displaying colors respectively correspond to the same converted pixel signal (TDATA'), such as both of the pixel signal DATA'(11) for blue and the DATA'(10) for red corresponding to the same converted pixel signal TDATA'(011).

From the simplified example described above, since the difference among the gamma curves is not great, the magnitude ranges of the three converted pixel signal groups for the three different colors respectively are largely overlapped. Also, since the magnitude difference between $V_{BM}$ and $V_{RM}$ is not great, as shown in FIG. 8, not all of the nine-bit binary numbers are needed to represent all converted pixel signals. The magnitude range of the converted pixel signal can be a little bit wider than that of the pixel signal. The magnitude range of nine-bit binary numbers is 0~511 in order to represent 512 different values. However, only 0~300 are needed to represent all converted pixel signals in this embodiment to perform the pixel signal converting process 704.

Figure 10:
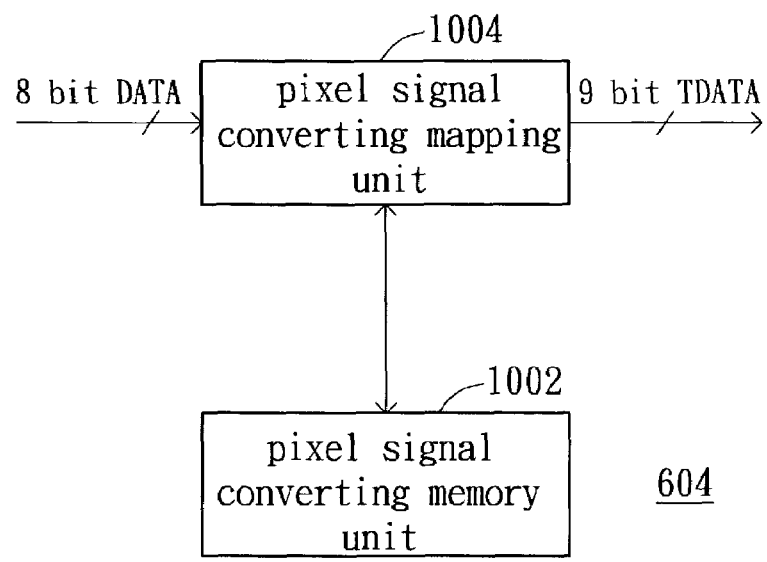
FIG. 10 shows the block diagram of the pixel signal converting device.

Each of the pixel signals 0, 63, 127, 191, and 255 corresponds to the converted pixel signal 0, 80, 155, 230, and 300 respectively when performing the pixel signal converting process 704. FIG. 10 shows the block diagram of the pixel signal converting device. The pixel signal converting device 604 includes a pixel signal converting mapping unit 1004 and a pixel signal converting memory unit 1002. The pixel signal converting memory unit 1002 can be a synchronous dynamic random access memory (SDRAM) for storing the relations between each pixel signal (DATA)

and the corresponding converted pixel signal (TDATA). The relations between each pixel signal (DATA) and the corresponding converted pixel signal (TDATA) are stored in the form of a look-up-table (LUT) in the pixel signal converting memory unit 1002. Since not all of the nine-bit binary numbers 0~511, but only 0~300 are needed to represent all converted pixel signals, the memory size of the pixel signal converting memory unit 1002 can be reduced. The corresponding relations between each of the pixel signals and the corresponding converted pixel signal are determined according to the gamma curve for the specific displaying color. The magnitude range of three converted pixel signal groups for different displaying colors respectively are different. The pixel signal converting mapping unit 1004 is coupled to the pixel signal converting memory unit 1002 for outputting the converted pixel signal (TDATA) corresponding to the receiving pixel signal (DATA) according to the corresponding relation stored in the pixel signal converting memory unit 1002. For example, if the pixel signal converting mapping unit 1004 receives a pixel signal for red color, then it outputs corresponding converted pixel signals according to a look-up-table of red color stored in the pixel signal converting memory unit.

Figure 11:
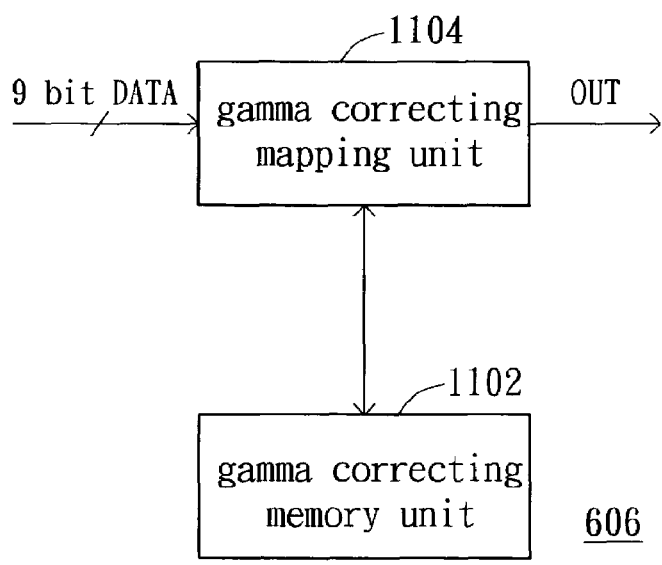
FIG. 11 shows the block diagram of the gamma correcting device.

Then, the gamma correction process 706 is performed. The converted pixel signal (TDATA) is delivered into the gamma correcting device 606. The gamma correcting device 606 is for converting the converted pixel signal (TDATA) to the corresponding gamma voltage signal (OUT). FIG. 11 shows one embodiment of the block diagram of the gamma correcting device. The gamma correcting device 606 includes a gamma correcting mapping unit 1104 and a gamma correcting memory unit 1102. The gamma correcting memory unit 1102 can be a synchronous dynamic random access memory (SDRAM) for storing the relations between each converted pixel signal (TDATA) and the corresponding gamma voltage signal (OUT). The relations between each converted pixel signal (TDATA) and the corresponding gamma voltage signal (OUT) are stored in the form of a look-up-table (LUT) in the gamma correcting memory unit 1102. The corresponding relations between each of the converted pixel signals and the corresponding gamma voltage signal are determined according to the gamma curve for the specific displaying color. The magnitude range of the three gamma voltage signal groups for the different displaying colors respectively are different. The gamma correcting mapping unit 1104 coupled to the gamma correcting memory unit 1102 can be a digital-to-analog converter (DAC) for outputting the gamma voltage signal (OUT) corresponding to the receiving converted pixel signal (TDATA) according to the corresponding relation stored in the gamma correcting memory unit 1102.

For another embodiment of this invention, it is not required that the gamma correcting device utilizes a gamma correcting memory unit 1102 shown in FIG. 11. The gamma correcting mapping unit can be a non-linear DAC.

Finally, the process 708 of outputting the gamma voltage signal (OUT) is performed. The gamma correction executed by the digital-to-analog converting apparatus of the preferred embodiment of the present invention is accomplished.

The relation between each digital pixel signal and the corresponding converted pixel signal can be determined according the gamma curve for the displaying color of the corresponding pixel. The magnitudes of the converted pixel signals corresponding to the same digital pixel signals respectively may be different if the displaying colors of the pixels corresponding to the pixels respectively are different. The magnitude range of the converted pixel signals is determined according to the displaying color of the corresponding pixel. Additionally, for the maximum digital pixel signals which have the displaying colors of the corresponding pixels of red, blue, and green, the corresponding gamma voltage signals are $V_{RM}$, $V_{BM}$, and $V_{GM}$ respectively. In this manner, all pixels corresponding to the maximum digital pixel signal can be at its maximum luminance regardless of the displaying color. Thus, the performance of the display panel can be improved.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus configured in a liquid crystal display (LCD) for converting a digital pixel signal to a gamma voltage signal, wherein the gamma voltage signal is for application to a pixel, the pixel for displaying a predetermined color with an intensity according to the gamma voltage signal, the displaying color of the pixel being one of a group of colors, pixels for displaying the respective colors reaching respective maximum light luminances at respective maximum gamma voltages for the respective colors, the digital pixel signal being an M-bit binary signal and having a range of magnitude independent of the color of the displaying color of the pixel, the apparatus comprising:

a pixel signal converting device for converting the digital pixel signal to a converted pixel signal, wherein
the relation between the digital pixel signal and the converted pixel signal is determined according to the displaying color of the pixel,
the magnitude of the converted pixel signal has a range determined according to the displaying color of the pixel, and
the range of magnitude of the converted pixel signal with respect to the displaying color of the pixel depends on the maximum gamma voltage at which the pixel reaches the maximum light luminance with respect to the displaying color of the pixel; and a gamma correcting device coupled to the pixel signal converting device for outputting the gamma voltage signal according to the converted pixel signal, wherein when the converted pixel signal indicates a maximum value in the range of magnitude with respect to the displaying color of the pixel, the gamma voltage signal is the maximum gamma voltage at which the pixel reaches maximum light luminance with respect to the displaying color of the pixel.

2. The apparatus according to claim 1, wherein the displaying color of the pixel is selected from the group consisting of red, blue, and green.

3. The apparatus according to claim 2, wherein when receiving a first gamma voltage signal, the pixel is at the maximum luminance if the displaying color is red; when receiving a second gamma voltage signal, the pixel is at the maximum luminance if the displaying color is blue; and when receiving a third gamma voltage signal, the pixel is at the maximum luminance if the displaying color is green; and the first, second and third gamma voltage signals have not to be the same.

4. The apparatus according to claim 3, wherein a maximum digital pixel signal corresponds to a maximum converted pixel signal.

5. The apparatus according to claim 4, wherein the maximum converted pixel signal corresponds to the first gamma voltage signal if the displaying color of the pixel is red; the maximum converted pixel signal corresponds to the second gamma voltage signal if the displaying color of the pixel is blue; and the maximum converted pixel signal corresponds to the third gamma voltage signal if the displaying color of the pixel is green.

6. The apparatus according to claim 1, wherein the pixel signal converting device further comprises:
a pixel signal converting memory unit for storing a corresponding relation between the digital pixel signal and the converted pixel signal with respect to the predetermined color displayed by the pixel; and
a pixel signal converting mapping unit coupled to the pixel signal converting memory unit for converting the digital pixel signal to the converted pixel signal according to the corresponding relation stored in the pixel signal converting memory unit.

7. The apparatus according to claim 6, wherein the pixel signal converting memory unit is a synchronous dynamic random access memory (SDRAM).

8. The apparatus according to claim 6, wherein the converted pixel signal is an N-bit binary signal, and the number of the converted pixel signal stored in the pixel signal converting memory unit is smaller than $2^N$, where N is larger than M.

9. The apparatus according to claim 1, wherein the relation between the converted pixel signal and the gamma voltage signal is determined according to the displaying color of the pixel.

10. The apparatus according to claim 9, wherein the gamma correcting device further comprises:
a gamma correcting memory unit for storing a corresponding relation between the converted digital pixel signal and the gamma voltage signal; and
a gamma correcting mapping unit coupled to the gamma correcting memory unit for converting the converted pixel signal to the gamma voltage signal according to the corresponding relation stored in the gamma correcting memory unit.

11. The apparatus according to claim 10, wherein the gamma correcting memory unit is a synchronous dynamic random access memory (SDRAM).

12. The apparatus according to claim 1, wherein the apparatus is set in a driving circuit of the liquid crystal display.

13. The apparatus according to claim 1, wherein the pixel signal converting device converts the digital pixel signal to the converted pixel signal so that the range of magnitude of the converted pixel signal with respect to the displaying color of the pixel is larger than the range of magnitude of the digital pixel signal when the maximum gamma voltage with respect to the displaying color of the pixel is not a lowest one among determined maximum gamma voltages.

14. The apparatus according to claim 1, wherein the pixel signal converting device converts the digital pixel signal to the converted pixel signal so that the range of magnitude of the converted pixel signal is equal to the range of magnitude of the digital pixel signal when the maximum gamma voltage with respect to the displaying color of the pixel is a lowest one among determined maximum gamma voltages.

15. The apparatus according to claim 1, wherein the gamma correcting device for converting the converted pixel signal to the gamma signal according to a corresponding gamma curve with respect to the displaying color of the pixel.

16. A method for converting a digital pixel signal to a gamma voltage signal, wherein the gamma voltage signal is for applying to a pixel for a displaying color, the displaying color of the pixel is one of a group of colors, pixels for displaying the respective colors reaching respective maximum light luminances at respective maximum gamma voltages for the respective colors, the digital pixel signal being an M-bit binary signal and having a range of magnitude independent of the color of the displaying color of the pixel, the method comprising:
determining the maximum gamma voltages of the respective colors at which pixels for displaying the respective colors reach the corresponding maximum light luminance,
receiving the digital pixel signal;
converting the received digital pixel signal to a converted pixel signal according to the displaying color of the pixel, wherein the.relation between the digital pixel signal and the converted pixel signal is determined according to the displaying color of the pixel, the magnitude of the converted pixel signal has a range determined according to the displaying color of the pixel, and the range of magnitude of the converted pixel signal with respect to the displaying color of the pixel depends on the maximum gamma voltage at which the pixel reaches the maximum light luminance with respect to the displaying color of the pixel;
converting the converted pixel signal to the gamma voltage signal, wherein the relation between the converted pixel signal and the gamma voltage signal is determined according to the displaying color of the pixel, and when the converted pixel signal indicates a maximum value in the range of magnitude with respect to the displaying color of the pixel, the gamma voltage signal is the maximum gamma voltage at which the pixel reaches maximum light luminance with respect to the displaying color of the pixel; and
outputting the gamma voltage signal.

17. The method according to claim 16, wherein the displaying color is selected from the group consisting of red, blue, and green.

18. The method according to claim 17, wherein when receiving a first gamma voltage signal, the pixel is at the maximum luminance if the displaying color is red; when receiving a second gamma voltage signal, the pixel is at the maximum luminance if the displaying color is blue; and when receiving a third gamma voltage signal, the pixel is at the maximum luminance if the displaying color is green; and the first, second and third gamma voltage signals have not to be the same.

19. The method according to claim 18, wherein a maximum digital pixel signal corresponds to a maximum converted pixel signal.

20. The method according to claim 19, wherein the maximum converted pixel signal corresponds to the first gamma voltage signal if the displaying color of the pixel is red; the maximum converted pixel signal corresponds to the second gamma voltage signal if the displaying color of the pixel is blue; and the maximum converted pixel signal corresponds to the third gamma voltage signal if the displaying color of the pixel is green.

21. The method according to claim 16, wherein the apparatus is set in a driving circuit of the liquid crystal display.

22. The method according to claim 16, wherein in the step of converting the received digital pixel signal to the converted pixel signal, the range of magnitude of the converted pixel signal with respect to the displaying color of the pixel is larger than the range of magnitude of the digital pixel signal when the maximum gamma voltage with respect to the displaying color of the pixel is not a lowest one among determined maximum gamma voltages.

23. The method according to claim 16, wherein in the step of converting the received digital pixel signal to the converted pixel signal, the range of magnitude of the converted pixel signal is equal to the range of magnitude of the digital pixel signal when the maximum gamma voltage with respect to the displaying color of the pixel is a lowest one among determined maximum gamma voltages.

24. The method according to claim 16, wherein in the step of converting the converted pixel signal to the gamma voltage signal, the converted pixel signal is converted to the gamma signal according to a corresponding gamma curve with respect to the displaying color of the pixel.

25. An apparatus set in a liquid crystal display (LCD) for converting a digital pixel signal to a gamma voltage signal, wherein the gamma voltage signal is for inputting to a pixel for a displaying color, the displaying color of the pixel is one of a group of colors, pixels for displaying the respective colors reach respective maximum light luminances at respective maximum gamma voltages for the respective colors, the digital pixel signal is an M-bit binary signal and has a range of magnitude independent of the color of the displaying color of the pixel, the apparatus comprising:

a pixel signal converting device for converting the digital pixel signal to a converted pixel signal, the pixel signal converting device including:

a pixel signal converting memory unit for storing a corresponding relation between the digital pixel signal and the converted pixel signal with respect to the displaying color, wherein the magnitude of the converted pixel signal has a range determined according to the displaying color of the pixel, and the range of magnitude of the converted pixel signal with respect to the displaying color of the pixel depends on the maximum gamma voltage at which the pixel reaches the maximum light luminance with respect to the displaying color of the pixel, and a pixel signal converting mapping unit coupled to the pixel signal converting memory unit for converting the digital pixel signal to the converted pixel signal according to the corresponding relation stored in the pixel signal converting memory unit, wherein the relation between the digital pixel signal and the converted pixel signal is determined according to the displaying color of the pixel; and a gamma correcting device coupled to the pixel signal converting device for outputting the gamma voltage signal according to the converted pixel signal, the gamma correcting device including:

a gamma correcting memory unit for storing a corresponding relation between the converted digital pixel signal and the gamma voltage signal with respect to the displaying color, wherein when the converted pixel signal indicates a maximum value in the range of magnitude with respect to the displaying color of the pixel, the gamma voltage signal is the maximum gamma voltage at which the pixel reaches maximum light luminance with respect to the displaying color of the pixel, and a gamma correcting mapping unit coupled to the gamma correcting memory unit for converting the converted pixel signal to the gamma voltage signal according to the corresponding relation stored in the gamma correcting memory unit, wherein the relation between the converted pixel signal and the gamma voltage signal is determined according to the displaying color of the pixel.

26. The apparatus according to claim 25, wherein the pixel signal converting device converts the digital pixel signal to the converted pixel signal so that the range of magnitude of the converted pixel signal with respect to the displaying color of the pixel is larger than the range of magnitude of the digital pixel signal when the maximum gamma voltage with respect to the displaying color of the pixel is not a lowest one among determined maximum gamma voltages.

27. The apparatus according to claim 25, wherein the pixel signal converting device converts the digital pixel signal to the converted pixel signal so that the range of magnitude of the converted pixel signal is equal to the range of magnitude of the digital pixel signal when the maximum gamma voltage with respect to the displaying color of the pixel is a lowest one among determined maximum gamma voltages.

28. The apparatus according to claim 25, wherein the gamma correcting device for converting the converted pixel signal to the gamma signal according to a corresponding gamma curve with respect to the displaying color of the pixel.

* * * * *